(12) United States Patent
Franke et al.

(10) Patent No.: US 6,868,807 B2
(45) Date of Patent: Mar. 22, 2005

(54) STEAM GENERATOR

(75) Inventors: Joachim Franke, Altdorf (DE); Rudolf Kral, Stulln (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/479,994

(22) PCT Filed: May 27, 2002

(86) PCT No.: PCT/DE02/01936
§ 371 (c)(1),
(2), (4) Date: Dec. 8, 2003

(87) PCT Pub. No.: WO02/101292
PCT Pub. Date: Dec. 19, 2002

(65) Prior Publication Data
US 2004/0149239 A1 Aug. 5, 2004

(30) Foreign Application Priority Data
Jun. 8, 2001 (DE) .......................... 101 27 830

(51) Int. Cl.$^7$ ............................................ F22B 19/00
(52) U.S. Cl. .............................. 122/406.4; 122/235.23; 122/258
(58) Field of Search ...................... 122/1 B, 406.4, 122/235.11, 235.23, 451 S, 7 R, 258, 136 R, 138, 140.2, 152, 153

(56) References Cited

U.S. PATENT DOCUMENTS

| 589,553 | A | * | 9/1897 | Stiff .............................. 122/40 |
| 2,699,758 | A | * | 1/1955 | Dalin .......................... 122/1 R |
| 4,357,907 | A | * | 11/1982 | Campbell et al. ............ 122/4 D |
| 4,421,065 | A | * | 12/1983 | Tillequin .................. 122/155.1 |
| 4,664,067 | A | * | 5/1987 | Haneda et al. ............... 122/7 R |
| 4,685,426 | A | | 8/1987 | Kidaloski et al. |
| 4,858,562 | A | * | 8/1989 | Arakawa et al. ............ 122/7 R |
| 5,159,897 | A | | 11/1992 | Franke et al. |
| 5,575,244 | A | * | 11/1996 | Dethier .................... 122/406.1 |
| 6,019,070 | A | | 2/2000 | Duffy |
| 6,092,490 | A | * | 7/2000 | Bairley et al. ............... 122/7 R |
| 6,189,491 | B1 | * | 2/2001 | Wittchow et al. ........... 122/1 C |
| 6,557,500 | B1 | * | 5/2003 | Schroeder .................... 122/7 R |
| 6,588,379 | B2 | * | 7/2003 | Bingham et al. ...... 122/235.16 |

FOREIGN PATENT DOCUMENTS

| DE | 1176155 | 8/1964 |
| DE | 0425 717 B1 | 5/1995 |
| DE | 196 51 936 A1 | 7/1998 |
| DE | 197 00 350 A1 | 7/1998 |
| EP | 0 944 801 B1 | 2/2001 |

OTHER PUBLICATIONS

Patent Abstracts of Japan, Publication No. 03221702 published on Sep. 30, 1991.

* cited by examiner

Primary Examiner—Gregory A. Wilson
(74) Attorney, Agent, or Firm—Staas & Halsey LLP

(57) ABSTRACT

A steam generator has a continuous heating surface located in a fuel gas channel that can be traversed in an approximately horizontal fuel gas directions. The continuous heating surface has a plurality of steam generator pipes that are connected in parallel for the passage of a flow medium and is designed in such a way that a steam generator pipe, which is heated to a greater extent than another steam generator pipe of the same continuous heating surface, has a higher throughput of the flow medium than the other steam generator pipe. The aim is to produce a low-cost steam generator with a particularly high level of mechanical stability, even when subjected to different thermal stresses. To achieve this, the or each steam generator pipe has a respective downpipe section, which is approximately vertical and through which the flow medium can flow downwards and a respective riser pipe section connected downstream of the downpipe on the flow medium side, which is approximately vertical and through which the flow medium can flow upwards.

20 Claims, 3 Drawing Sheets

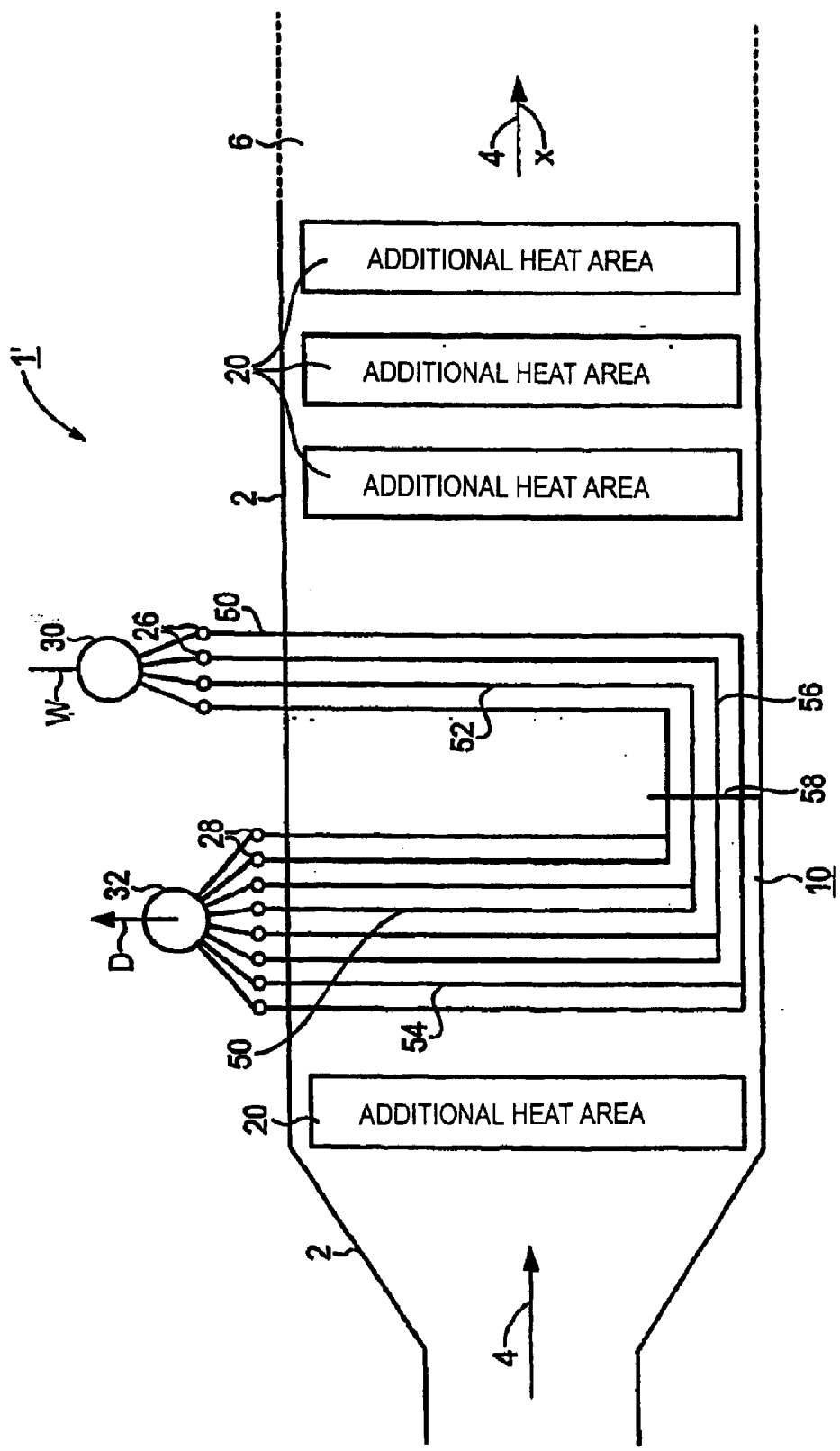

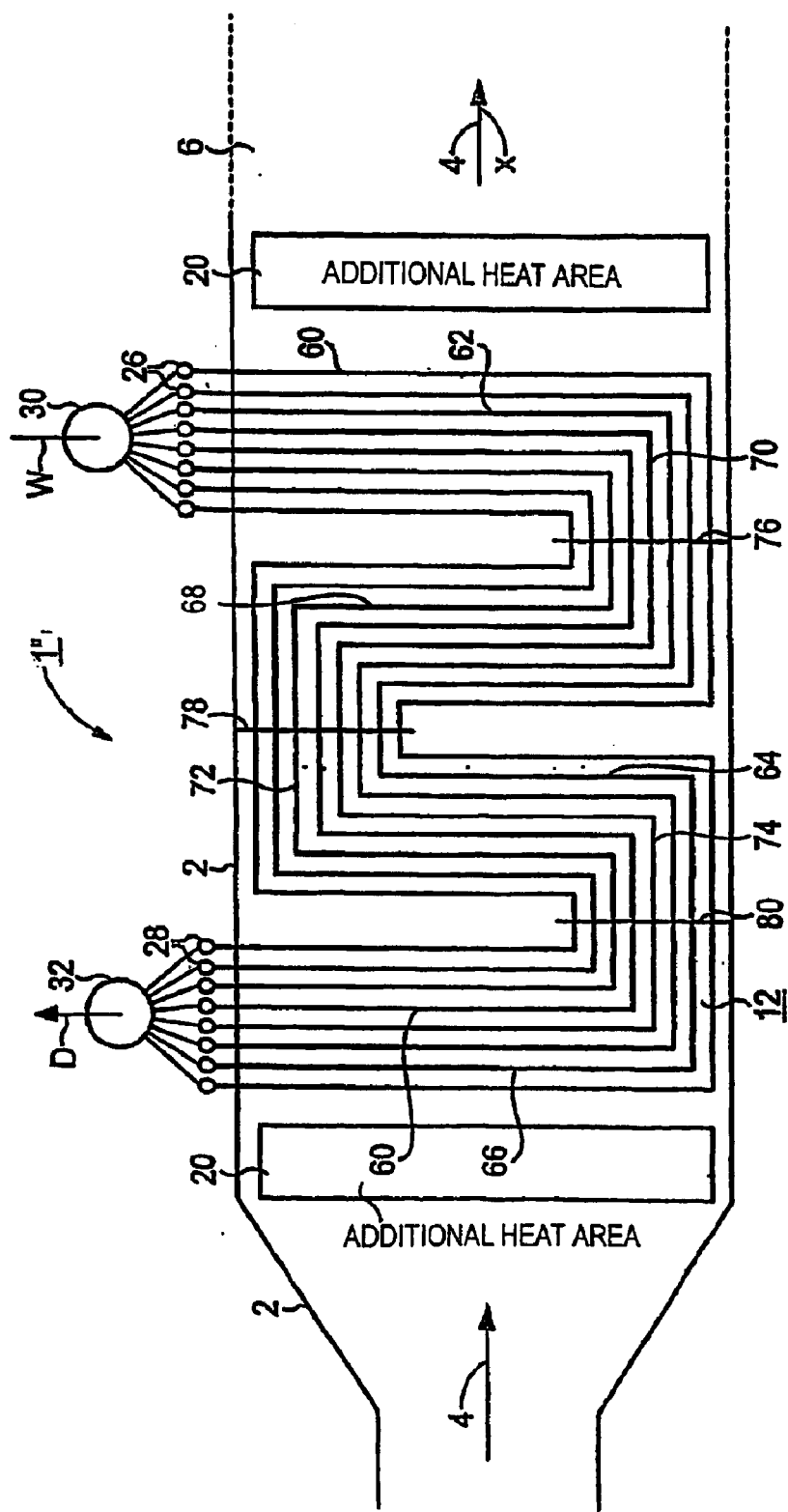

STEAM GENERATOR

CROSS REFERENCE TO RELATED APPLICATIONS

This application is based on and hereby claims priority to German Application No. 10127830.6 filed on Jun. 8, 2001, the contents of which are hereby incorporated by reference.

BACKGROUND OF THE INVENTION

The invention relates to a steam generator in which a once-through heating area is arranged in a heating-gas duct through which flow can occur in an approximately horizontal heating-gas direction, which once-through heating area comprises a plurality of steam generator tubes connected in parallel to the throughflow of a flow medium and which is designed in such a way that a steam generator tube heated to a greater extent compared with a further steam generator tube of the same once-through heating area has a higher rate of flow of the flow medium compared with the further steam generator tube.

In a gas- and steam-turbine plant, the heat contained in the expanded working medium or heating gas from the gas turbine is used for generating steam for the steam turbine. The heat transfer is affected in a heat-recovery steam generator which is connected downstream of the gas turbine and in which a plurality of heating areas for water preheating, for steam generation and for steam superheating are normally arranged. The heating areas are connected in the water/steam circuit of the steam turbine. The water/steam circuit normally comprises several, e.g. three, pressure stages, in which case each pressure stage may have an evaporator heating area.

For the steam generator connected as a heat-recovery steam generator downstream of the gas turbine on the heating-gas side, a plurality of alternative design concepts come into consideration, namely the design as a once-through steam generator or the design as a circulation steam generator. In a once-through steam generator, the heating of steam generator tubes provided as evaporator tubes leads to an evaporation of the flow medium in the steam generator tubes in a single pass. In contrast thereto, in a natural- or forced-circulation steam generator, the circulating water is only partly evaporated when passing through the evaporator tubes. The water which is not evaporated in the process is fed again to the same evaporator tubes for a further evaporation after separation of the generated steam.

A once-through steam generator, in contrast to a natural- or forced-circulation steam generator, is not subject to any pressure limit, so that live-steam pressures are possible well above the critical pressure of water ($P_{cri} \approx 221$ bar)— where there is only a slight difference in density between a medium similar to a liquid and a medium similar to steam. A high live-steam pressure promotes a high thermal efficiency and thus low $CO_2$ emissions of a fossil-fired power plant. In addition, a once-through steam generator has a simple type of construction compared with a circulation steam generator and can therefore be manufactured at an especially low cost. The use of a steam generator designed according to the once-through principle as a heat-recovery steam generator of a gas- and steam-turbine plant is therefore especially favorable for achieving a high overall efficiency of the gas- and steam-turbine plant in a simple type of construction.

Particular advantages with regard to the cost of manufacture, but also with regard to necessary maintenance work, are offered by a heat-recovery steam generator in a horizontal type of construction, in which the heating medium or heating gas, that is to say the exhaust gas from the gas turbine, is conducted through the steam generator in an approximately horizontal direction of flow. In a once-through steam generator in a horizontal type of construction, however, the steam generator tubes of a heating area, depending on their positioning, may be subjected to heating that differs greatly. In particular in the case of steam generator tubes connected on the outlet side to a common collector, different heating of individual steam generator tubes may lead to a union of steam flows having steam parameters differing greatly from one another and thus to undesirable efficiency losses, in particular to comparatively reduced effectiveness of the relevant heating area and consequently reduced steam generation. In addition, different heating of adjacent steam generator tubes, in particular in the region where they open into collectors, may result in damage to the steam generator tubes or the collector. The use, desirable per se, of a once-through steam generator of horizontal type of construction as a heat-recovery steam generator for a gas turbine may therefore entail considerable problems with regard to a sufficiently stabilized flow guidance.

EP 0944 801 B1 discloses a steam generator which is suitable for being designed in a horizontal type of construction and in addition has the aforesaid advantages of a once-through steam generator. To this end, the known steam generator is designed with regard to its once-through heating area in such a way that a steam generator tube heated to a greater extent compared with a further steam generator tube of the same once-through heating area has a higher rate of flow of the flow medium compared with the further steam generator tube. The once-through heating area of the known steam generator therefore exhibits a self-stabilizing behavior like the flow characteristic of a natural-circulation evaporator heating area (natural-circulation characteristic) when individual steam generator tubes are heated to a different extent, and this behavior, without the need for exerting an external influence, leads to adaptation of the outlet-side temperatures even on steam generator tubes heated to a different extent and connected in parallel on the flow-medium side. However, the known steam generator is comparatively complicated from a design point of view, in particular with regard to the water- and/or steam-side distribution of the flow medium. In addition, problematic differential expansions may occur between adjacent evaporator tubes and may lead to inadmissible thermal stresses and thus to damage to tubes and collectors.

SUMMARY OF THE INVENTION

One possible object of the invention is therefore to specify a steam generator of the type mentioned at the beginning which can be manufactured at an especially low cost and which has especially high mechanical stability even during different thermal loading.

The inventors propose that one of or each of the steam generator tubes in each case comprises an approximately vertically arranged downcomer section, through which the flow medium can flow in the downward direction, and an approximately vertically arranged riser section which is connected downstream of the downcomer section on the flow-medium side and through which the flow medium can flow in the upward direction.

In this case, a steam generator can be manufactured at an especially low assembly and production cost, for an especially stable operating behavior which is especially insensitive to differences in the thermal loading, the design principle, applied in the known steam generator, of a natural-circulation characteristic for a once-through heating area should be logically developed and further improved. The once-through heating area should in this case be designed for the application of a comparatively low mass-flow density with comparatively low friction pressure loss.

In order to assist the natural-circulation characteristic of the throughflow in this design, provision is made for dividing the steam generator tubes of the once-through heating area into in each case at least two segments (of parallel tubes), the first segment comprising all downcomer sections and flow occurring through it in the downward direction. Correspondingly, the second segment comprises all riser sections and flow occurs through it in the upward direction. In the downcomer sections of the first segment, the contribution of the geodetic pressure, that is to say essentially the weight of the water column, therefore acts in the direction of the intended throughflow and promotes the latter by a positive contribution to the pressure change along the flow path, that is to say by a gain in pressure. Only in the second segment or riser section does the contribution of the geodetic pressure act against the intended throughflow direction and therefore contribute to the pressure loss. In total, however, the two geodetic pressure contributions can virtually neutralize one another, it is even conceivable for the throughflow-promoting geodetic pressure contribution in the first segment or downcomer section to exceed the throughflow-inhibiting geodetic pressure contribution in the second segment or riser section, so that, as in natural-circulation systems, there is a flow-maintaining or flow-promoting pressure contribution overall.

The downcomer section of each steam generator tube is expediently arranged in the heating-gas duct downstream of the riser section assigned to it as viewed in the heating-gas direction. In other words: the steam generator tubes are expediently spatially arranged in the heating-gas duct in such a way that the first segment or downcomer section as viewed on the flow-medium side is arranged on the flue-gas side downstream of the second segment or riser section as viewed on the flow-medium side. In such an arrangement, each riser section is thus subjected to a comparatively more intense heating by the heating gas than that downcomer section of the same steam generator tube which is assigned to it. Thus, the relative steam proportion of the flow medium in the riser section also markedly exceeds the relative steam proportion of the flow medium in the downcomer section, so that the geodetic pressure contribution, essentially given by the weight of the water/steam column in the respective tube length, is markedly higher in the downcomer section than in the riser section assigned to it.

In a further or alternative advantageous configuration, an especially simple construction of the once-through heating area, on the one hand, and an especially low mechanical loading of the once-through heating area, even during different thermal loading, on the other hand, can be achieved by the downcomer section of one or each steam generator tube being connected on the flow-medium side via an overflow section to the riser section assigned to it. In such a configuration, the respective steam generator tube therefore essentially has a u shape in which the legs are provided by the riser section, on the one hand, and by the downcomer section, on the other hand, and the bend is provided by the overflow section connecting the riser section and downcomer section.

Such an arrangement is especially suitable for expansion compensation during varying thermal loading; this is because the overflow section connecting the downcomer section and the riser section serves in this case as an expansion bend, which can readily compensate for relative changes in length of the riser section and/or of the downcomer section. The overflow section therefore ensures that the steam generator tubes are turned in the bottom region of a first evaporator stage provided by the downcomer sections and are directly continued and turned again in the bottom region of a second evaporator stage formed by the riser sections.

The overflow section is advantageously arranged inside the heating-gas duct. Alternatively, however, the overflow section may also be disposed outside the heating-gas duct, in particular if a draining collector is to be connected to the overflow section if the once-through heating area possibly has to be drained.

In the event of the flow-promoting pressure contribution in the downcomer section of a steam generator exceeding the flow-inhibiting pressure contribution in the riser section assigned to it to an especially high degree, the resulting outflow of flow medium from the downcomer section into the riser section could exceed the inlet-side inflow of flow medium into the downcomer section. Therefore the or each steam generator tube is advantageously designed with regard to its overall pressure balance in such a way that the flow-promoting pressure contribution occurring overall in the downcomer section is only limited with regard to the flow-inhibiting pressure contribution occurring in the riser section.

To this end, the downcomer section of one or of each steam generator tube of the steam generator is advantageously designed for a sufficiently high friction pressure loss of the flow medium flowing through. This may be done, for example, by suitable dimensioning, in particular in cross section, of the individual tube sections. In this case, one or each steam generator tube, in a type of bifurcation, in each case also expediently comprises a plurality of riser sections connected downstream of a common downcomer section on the flow-medium side and mutually connected in parallel to the throughflow of the flow medium. In an alternative or further advantageous configuration, in each case a throttle device is connected on the flow-medium side upstream of the downcomer section of the or each steam generator tube, via which throttle device in particular the individual rate of flow can be set during the feeding of the respective downcomer section.

The steam generator tubes can be combined inside the heating-gas duct to form tube rows, of which each in each case comprises a plurality of steam generator tubes arranged next to one another perpendicularly to the heating-gas direction. In such a configuration, the steam generator tubes are preferably directed in such a way that the tube row of the downcomer sections which is heated to the lowest degree or which is the last row as viewed in the heating-gas direction is assigned to the riser sections forming the tube row heated to the greatest degree, that is to say to the first tube row as viewed in the heating-gas direction. To this end, the riser and downcomer sections of a plurality of steam generator tubes are expediently positioned relative to one another in the heating-gas duct in such a way that a riser section lying comparatively far forward as viewed in the heating-gas direction is assigned to a downcomer section lying comparatively far back as viewed in the heating-gas direction. By such an arrangement, which spatially corresponds essentially to a nested arrangement of a plurality of u-shaped steam generator tubes, the riser sections heated to a comparatively high degree are fed with flow medium preheated to a comparatively low degree and flowing out of the downcomer sections.

The geodetic pressure contribution, promoting the flow overall, through the downcomer section connected upstream in each case is thus especially high precisely in the riser sections heated to a comparatively high degree, so that especially pronounced additional feeding with flow medium from the assigned downcomer section is automatically effected. The automatic additional feeding from the assigned downcomer section is therefore effected in this case in such a way as to especially meet the requirements precisely for tubes heated to a high degree, so that the desired natural-circulation characteristic is intensified to an especially high degree.

In order to provide the flow-promoting geodetic pressure contribution in the respective steam generator tube, the respective steam generator tube can be designed in such a way that it comprises merely one downcomer section and merely one riser section connected downstream of the downcomer section on the flow-medium side. However, especially high flexibility during the adaptation of the heat adsorptivity of the flow medium flowing through the steam generator tube to the temperature profile of the heating gas flowing through the heating-gas duct can be achieved by a plurality of steam generator tubes in each case comprising a plurality of downcomer and riser sections connected alternately one behind the other on the flow-medium side. In this case, each of these steam generator tubes, as viewed in the direction of flow of the flow medium, has first of all a first downcomer section, following which, after suitable turning, preferably via an overflow section, is a first riser section designed for throughflow of the flow medium in the upward direction. Connected downstream of this riser section, preferably likewise after suitable turning via an overflow section arranged inside the heating-gas duct, is a second downcomer section designed for throughflow of the flow medium in the downward direction. A second riser section then again follows the second downcomer section. Furthermore, as and when required, a plurality of downcomer and riser sections may also be connected downstream in an alternating arrangement.

The steam generator is expediently used as a heat-recovery steam generator of a gas- and steam-turbine plant. In this case, the steam generator is advantageously connected downstream of a gas turbine on the heating-gas side. In this circuit, supplementary firing for increasing the heating-gas temperature may expediently be arranged downstream of the gas turbine.

The advantages achieved relate in particular to the fact that, by the two-stage or multistage configuration of the steam generator tubes having a downcomer section through which flow can occur in the downward direction and a riser section which is connected downstream of the downcomer section on the flow-medium side and through which flow can occur in the upward direction, at least in the first segment of the steam generator tube, a flow-promoting pressure contribution can be provided via the geodetic pressure of the water column located therein.

It is certainly true that heated evaporator systems through which flow occurs downward normally lead to flow instabilities which are not tolerable precisely during use in once-through evaporators. However, during feeding with comparatively low mass-flow density, a natural-circulation characteristic of the steam generator tube can be achieved in a reliable manner due to the comparatively low friction pressure loss, which natural-circulation characteristic, when a steam generator tube is heated to a greater extent compared with a further steam generator tube, leads to a comparatively higher rate of flow of the flow medium in the steam generator tube heated to a greater extent. This natural-circulation characteristic, even when using the segments through which flow occurs downwards, ensures a sufficiently stable and reliable flow through the steam generator tubes.

In addition, such a characteristic can be achieved at an especially low cost in terms of construction and assembly by the riser section being directly connected downstream of the downcomer section assigned to it, and without a complicated collector or distributor system being connected therebetween. The steam generator therefore has a relatively low degree of plant complexity in conjunction with an especially stable flow behavior. Furthermore, both the downcomer section and the riser section, connected downstream of it, of each steam generator tube can be fastened in each case in a suspended type of construction in the region of the casing ceiling of the heating-gas duct, free linear expansion being permitted in each case in the bottom region. Such linear expansions caused by thermal effects are now compensated for by the overflow section connecting the respective riser section to the downcomer section, so that no distortions occur on account of thermal effects.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 1, 2 and 3 each show in simplified representation a steam generator in a horizontal type of construction in longitudinal section.

DETAILED DESCRIPTION OF THE PREFERRED EMBODIMENT

Figure 1:
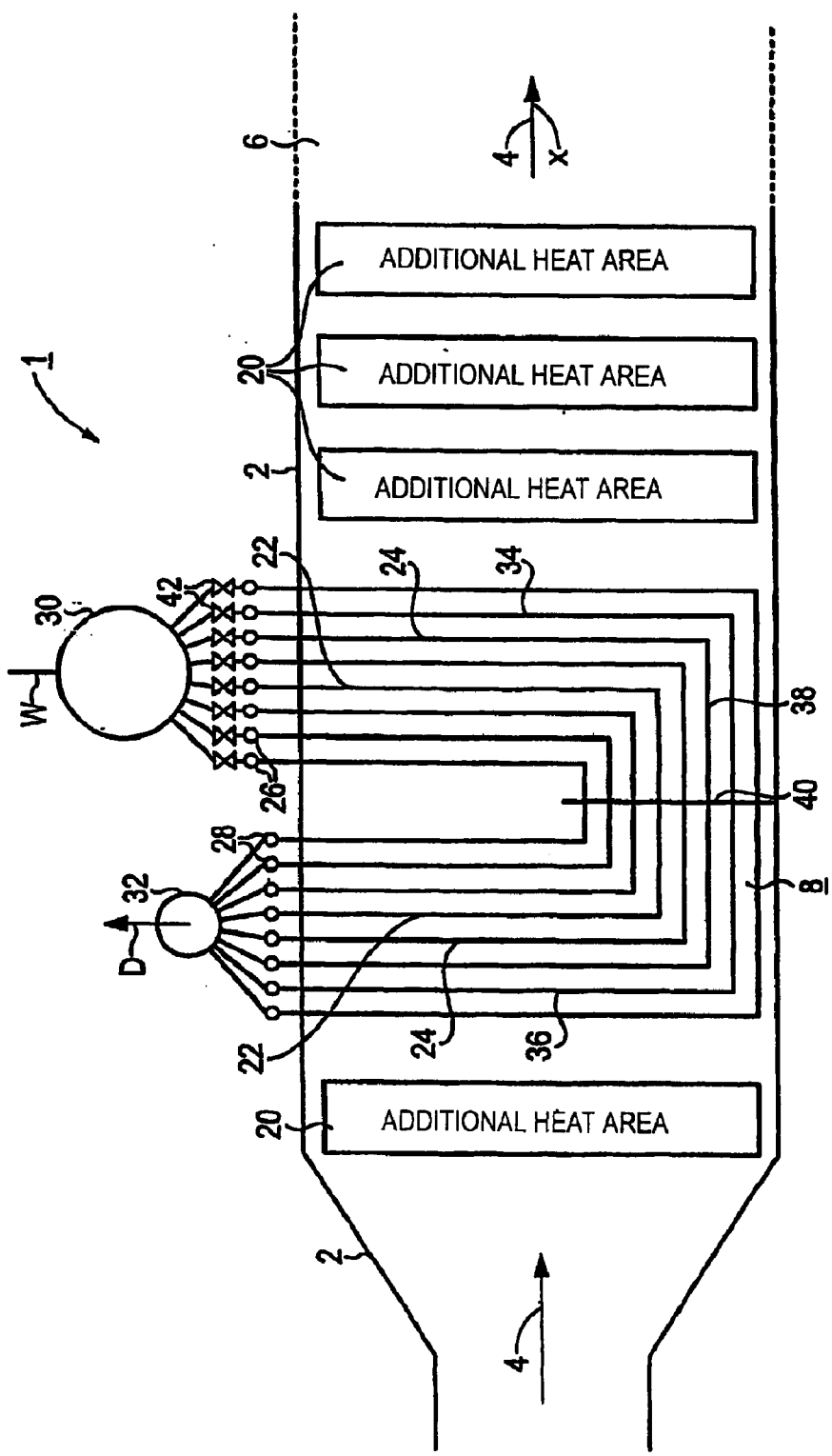

Reference will now be made in detail to the preferred embodiments of the present invention, examples of which are illustrated in the accompanying drawings, wherein like reference numerals refer to like elements throughout.

The same parts are provided with the same designations in all the figures.

The steam generator 1, 1', 1" according to FIGS. 1, 2 and 3, respectively, is arranged like a heat-recovery steam generator on the exhaust-gas side downstream of a gas turbine (not shown in any more detail). The steam generator 1, 1'. 1" has in each case an enclosing wall 2 which forms a heating-gas duct 6 for the exhaust gas from the gas turbine, through which heating-gas duct 6 flow can occur in an approximately horizontal heating-gas direction x indicated by arrows 4. A plurality of heating areas designed according to the once-through principle, and also referred to as once-through heating areas 8, 10 and 12, respectively, are arranged in each case in the heating-gas duct 6. In the exemplary embodiments according to FIGS. 1, 2 and 3, in each case only one once-through heating area 8, 10 or 12, respectively, is shown, but a larger number of once-through heating areas may also be provided.

Flow medium W can in each case be admitted to the evaporator system formed from the once-through heating areas 8, 10 and 12, respectively, and this flow medium W, during a single pass, is evaporated by the respective once-through heating area 8, 10 or 12 and, after the discharge from the once-through heating area 8, 10 or 12, respectively, is drawn off as steam D and is normally fed to superheater heating areas for further superheating. The evaporator system formed from the respective once-through heating area 8, 10 and 12, respectively, is in each case connected in the water/steam circuit (not shown in any more detail) of a steam turbine. In addition to the respective evaporator system, a plurality of further heating areas 20, in each case indicated schematically in FIGS. 1 to 3, are connected into the water/steam circuit of the steam turbine. The heating areas 20 may be, for example, superheaters, intermediate-pressure evaporators, low-pressure evaporators and/or pre-heaters.

The once-through heating area 8 of the steam generator 1 according to FIG. 1, like a tube bundle, comprises a plurality of steam generator tubes 22 connected in parallel to the throughflow of the flow medium W. Here, a plurality of steam generator tubes 22 are in each case arranged side by side as viewed in the heating-gas direction x. In this arrangement, only one of the steam generator tubes 22 arranged side by side in this way can be seen in each case. Here, on the flow-medium side, a common distributor 26 is arranged in each case upstream of the steam generator tubes 22 arranged side by side in this way and a common discharge collector 28 is arranged in each case downstream of the latter. In this case, the distributors 26 are in turn connected on the inlet side to a main distributor 30, the discharge collector 28 being connected on the outlet side to a common main collector 32.

The once-through heating area 8 is designed in such a way that it is suitable for feeding the steam generator tubes 22 with a comparatively low mass-flow density, the steam generator tubes 22 having a natural-circulation characteristic. In the case of this natural-circulation characteristic, a steam generator tube 22 heated to a greater extent compared with a further steam generator tube 22 of the same once-through heating area 8 has a higher rate of flow of the flow medium W compared with the further steam generator tube 22. In order to ensure this with especially simple design means in an especially reliable manner, the once-through heating area 8 comprises two segments connected in series on the flow-medium side. In the first segment, each steam generator tube 22 of the once-through heating area 8 comprises in this case an approximately vertically arranged downcomer section 34 through which the flow medium W can flow in the downward direction. In the second segment, each steam generator tube 22 comprises an approximately vertically arranged riser section 36 which is connected downstream of the downcomer section 34 on the flow-medium side and through which the flow medium W can flow in the upward direction.

In this case, the riser section 36 is connected to the downcomer section 34 assigned to it via an overflow section 38. In the exemplary embodiment, the overflow sections are directed inside the heating-gas duct 6 and, for spatial fixing, through a perforated plate 40 arranged in the heating-gas duct 6. Although this perforated plate 40 produces a local constriction of the cross section of flow available for the heating gas in the heating-gas duct 6, it has to be emphasized that the representation in FIG. 1 is not to scale, so that the relative constriction of the cross section of flow for the heating gas by the perforated plate 40 is only slight.

Alternatively, the overflow sections may also be directed outside, in particular below, the heating-gas duct 6. This may be favorable in particular for the case where draining of the once-through heating area 8 is to be provided for design or operational reasons. This draining, in the case of overflow sections 38 directed outside the heating-gas duct 6, may be effected by a draining collector connected to the overflow sections 38. In this case, the draining collector is preferably arranged spatially in the vicinity of the downcomer sections, so that the mobility of the heating-tube sections with regard to thermal expansion is retained without hindrance.

As can be seen in FIG. 1, each steam generator tube 22 of the once-through heating area 8 virtually has a u-shape, the legs of the U being formed by the downcomer section 34 and the riser section 36, and the connecting bend being formed by the overflow section 38. In a steam generator tube 22 of such a design, the geodetic pressure contribution of the flow medium W in the region of the downcomer section 34— in contrast to the region of the riser section 36— produces a flow-promoting and not a flow-inhibiting pressure contribution. In other words: the water column of unevaporated flow medium W located in the downcomer section 34 still "pushes" along the flow through the respective steam generator tube 22 instead of hindering it. As a result, the steam generator tube 22, considered as a whole, has a comparatively low pressure loss.

In the approximately unshaped type of construction, each steam generator tube 22 is suspended or fastened in the manner of a suspended construction on the ceiling of the heating-gas duct 6 in each case in the inlet region of its downcomer section 34 and in the outlet region of its riser section 36. On the other hand, the bottom ends, as viewed spatially, of the respective downcomer section 34 and of the respective riser section 36, which are connected to one another by their overflow section 38, are not fixed directly spatially in the heating-gas duct 6. Linear expansions of these segments of the steam generator tubes can therefore be tolerated without the risk of damage, the respective overflow section 38 acting as an expansion bend. This arrangement of the steam generator tubes 22 is therefore especially flexible mechanically and, with regard to thermal stresses, is insensitive to differential pressures which occur.

Heating of a steam generator tube 22 to a greater extent, in particular in its riser section 36, in this case leads there first of all to an increase in the evaporation rate, in the course of which, just on account of the dimensioning of the steam generator tube 22, an increase in the rate of flow through the steam generator tube 22 heated to a greater extent occurs as a result of this heating to a greater extent.

The steam generator tubes 22 of various tube rows 24 of the once-through heating area 8 are in addition arranged like U shapes nested one inside the other. To this end, the riser sections 36 and the downcomer sections 34 of a plurality of steam generator tubes 22 are positioned relative to one another in the heating-gas duct 6 in such a way that a riser section 36 lying relatively far forward as viewed in the heating-gas direction x is assigned to a downcomer section 34 lying relatively at the rear as viewed in the heating-gas direction x. By this arrangement, a riser section 36 heated to a relatively high degree communicates with a downcomer section 34 heated to a relatively low degree. A self-compensating effect is also achieved between the tube rows 24 by this relative positioning. This is because, precisely with a riser section 36 heated to a comparatively high degree and lying far forward, the heating to a greater extent results in an especially pronounced production of steam and thus in an especially high demand for additional feeding with flow medium W. However, precisely a riser section 36 heated to such a high degree is connected to a downcomer section 34 heated to a comparatively low degree. The downcomer section 34, on account of the comparatively low heat input into the flow medium W conducted in it, has an especially high flow-promoting geodetic pressure contribution, so that precisely such a downcomer section 34 heated to a comparatively low degree is suitable for providing an additional feeding quantity of comparatively cool flow medium W.

If the riser section 36 is heated to a greater extent then the flow-promoting geodetic pressure in the downcomer section 34 will further exceed the flow-inhibiting geodetic pressure in the corresponding riser section 36. The relatively far distance of the downcomer section 34 from the riser section 36 contributes to this effect. Greater heating results in increased feeding to the riser section 36 with flow medium W. On account of this therefore especially pronounced natural-circulation characteristic of the steam generator tubes 22, the latter, to a special degree, have a self-stabilizing behavior relative to locally different heating: heating of a row of steam generator tubes 22 to a greater extent leads in this case locally to the increased feeding of flow medium W into this row of steam generator tubes 22, so that, on account of the correspondingly increased cooling effect, an adaptation of the respective temperature values automatically occurs. The live steam flowing into the main collector 32 is therefore especially homogeneous with regard to its steam parameters, irrespective of the tube row 24 through which flow occurs individually.

Depending on the design point or intended operating point of the steam generator 1, 1', 1", the flow-promoting geodetic pressure contribution provided by an evaporator segment through which flow occurs downward may markedly exceed the flow-inhibiting geodetic pressure contribution of the second evaporator segment connected downstream. Therefore, it may be advantageous as a function of the design point to design the first evaporator segment for a comparatively high friction pressure loss. To this end, a throttle device 42 is in each case connected upstream of the tube rows of the steam generator 1 according to FIG. 1 between the main distributor 30 and the distributors 26 assigned to them in each case, which throttle device 42 can in particular also be designed to be adjustable or controllable.

Alternatively, to this end, the steam generator 1' in the exemplary embodiment according to FIG. 2 comprises a once-through heating area 10 whose steam generator tubes 50, in a first segment, in each case likewise have a downcomer section 52, downstream of which, however, on the flow-medium side, in each case a plurality of riser sections 54 mutually connected in parallel to the throughflow of the flow medium W are connected. In this case, in the exemplary embodiment, the overflow sections 56, via which the downcomer sections 52 are each connected to the plurality of riser sections 54 assigned to them, are again directed inside the heating-gas duct 6 and are mounted in a perforated plate 58. As and when required, however, they may also be laid outside the heating-gas duct 6. In the exemplary embodiment according to FIG. 2, in each case 2 riser sections 54 connected in parallel on the flow-medium side are connected downstream of each downcomer section 52. The tubes used here have identical dimensioning, so that the free cross section of flow for the flow medium W in the riser sections 54 connected in parallel is in each case twice as large as the cross section of flow in the downcomer section 52 jointly connected upstream of them. Alternatively, such a limit of the friction pressure loss in the downcomer sections 52, if required, can also be achieved by suitable dimensioning, in particular by selecting a comparatively small diameter.

The steam generator 1" in the exemplary embodiment according to FIG. 3 comprises a once-through heating area 12 which is likewise designed for a comparatively low friction pressure loss and is therefore especially suitable for ensuring a natural-circulation characteristic at a comparatively low mass-flow density. In addition, however, with regard to its heat absorptivity, the once-through heating area 12 of the steam generator 1" is especially adapted to the temperature profile of the heating gas flowing through the heating-gas duct 6. To this end, each of the steam generator tubes 60 forming the once-through heating area 12 in each case comprises a plurality—two in the exemplary embodiment—of downcomer sections 62, 64 and riser sections 66, 68 connected alternately one behind the other on the flow-medium side. Here, the first downcomer section 62 as viewed in the flow direction of the flow medium W is in each case connected via an overflow section 70 to the first riser section 66 connected downstream of it. The riser section 66 is in turn connected on the outlet side via an overflow section 72 to the second downcomer section 64 connected downstream of it. The second downcomer section 64 is connected to the second riser section 66 via an overflow section 74. The overflow sections 70, 72, 74 are again disposed inside the heating-gas duct 6 and are fastened in the base region and ceiling region, respectively, of the heating-gas duct 6 via in each case a perforated plate 76, 78 or 80, respectively.

The invention has been described in detail with particular reference to preferred embodiments thereof and examples, but it will be understood that variations and modifications can be effected within the spirit and scope of the invention.

What is claimed is:

1. A steam generator comprising:
   a heating gas duct through which heating gas flows in an approximately horizontal direction;
   a once-through heating area arranged in the heating-gas duct, the once-through heating area comprising a plurality of steam generator tubes connected in parallel with respect to a flow of a flow medium such that a first steam generator tube heated to a greater extent compared with a second steam generator tube in the once-through heating area has a higher rate of flow of the flow medium compared with the second steam generator tube, at least one of the steam generator tubes having an approximately vertically arranged down-corner section, through which the flow medium can flow in a downward direction, and an approximately vertically arranged riser section which is connected to said down-corner section at a location downstream with respect to a flow direction of the flow-medium, the riser section conveying the flow medium in an upward direction.

2. A steam generator as claimed in claim 1, wherein each steam generator tube has a down-corner section approximately vertically arranged down-corner section, through which the flow medium can flow in a downward direction, and an approximately vertically arranged riser section which is connected to said down-corner section at a location downstream with respect to a flow direction of the flow-medium, the riser section conveying the flow medium in an upward direction.

3. The steam generator as claimed in claim 2, wherein the down-corner section of the steam generator tube is arranged in the heating-gas duct downstream from the riser section with respect to a flow direction of the heating gas.

4. The steam generator as claimed in claim 3, wherein the down-corner section of the steam generator tube is connected to the riser section through an overflow section.

5. The steam generator as claimed in claim 4, wherein the overflow section is arranged inside the heating-gas duct.

6. The steam generator as claimed in claim 5, wherein at least one of the steam generator tubes has a plurality of riser sections connected downstream from a common down-corner section such that the riser sections are connected in parallel with respect to the flow medium.

7. The steam generator as claimed in claim 6, wherein the riser and down-corner sections of a plurality of steam generator tubes are positioned relative to one another in the heating-gas duct to equalize average position differences with respect to a flow direction of the heating gas in such a way that:
   if a first riser section is positioned further upstream than a second riser section with respect to a flow direction of the heating-gas, and
   if a first down-corner section is positioned further downstream than a second down-corner section with respect to the flow direction of the heating-gas,
   then the first riser section is connected to the first down-corner section and the second riser section is connected to the second down-corner section.

8. The steam generator as claimed in claim 7, wherein at least one of steam generator tubes has a plurality of down-comer sections and a plurality of riser sections connected alternately such that each down-corner section is followed on a downstream side thereof by a riser section.

9. The steam generator as claimed in claim 8, further comprising:
   a main distributor;
   a connecting line for each down-corner section, to connect the down-corner section to the main distributor; and
   a throttle device provided in each connecting line at a position upstream from the downcomer section and downstream from the main distributor.

10. The steam generator as claimed in claim 9, further comprising a gas turbine connected to the steam generator tubes of the once-through heating area at a location upstream with respect to the flow direction of the flow-medium.

11. The steam generator as claimed in claim 1, wherein the down-corner section of the steam generator tube is arranged in the heating-gas duct downstream from the riser section with respect to a flow direction of the heating gas.

12. The steam generator as claimed in claim 1, wherein the down-corner section of the steam generator tube is connected to the riser section through an overflow section.

13. The steam generator as claimed in claim 12, wherein the overflow section is arranged inside the heating-gas duct.

14. The steam generator as claimed in claim 1, wherein at least one of the steam generator tubes has a plurality of riser sections connected downstream from a common down-corner section such that the riser sections are connected in parallel with respect to the flow medium.

15. The steam generator as claimed in claim 1, wherein the riser and down-corner sections of a plurality of steam generator tubes are positioned relative to one another in the heating-gas duct to equalize average position differences with respect to a flow direction of the heating gas in such a way that:
   if a first riser section is positioned further upstream than a second riser section with respect to a flow direction of the heating-gas, and
   if a first down-corner section is positioned further downstream than a second downcomer section with respect to the flow direction of the heating-gas,
   then the first riser section is connected to the first down-corner section and the second riser section is connected to the second down-comer section.

16. The steam generator as claimed in claim 1, wherein at least one of steam generator tubes has a plurality of down-corner sections and a plurality of riser sections connected alternately such that each down-corner section is followed on a downstream side thereof by a riser section.

17. The steam generator as claimed in claim 1, further comprising:
   a main distributor;
   a connecting line for each down-corner section, to connect the down-corner section to the main distributor; and
   a throttle device provided in each connecting line at a position upstream from the downcomer section and downstream from the main distributor.

18. The steam generator as claimed in claim 1, further comprising a gas turbine connected to the steam generator tubes of the once-through heating area at a location upstream with respect to the flow direction of the flow-medium.

19. A steam generator comprising:
   a heating gas duct through which heating gas flows in an approximately horizontal direction; and
   a once-through heating area arranged in the heating-gas duct to fully vaporize a flow medium in a single pass through the heating gas duct, the heating area comprising a plurality of steam generator tubes connected in parallel with respect to a flow of a flow medium such that a first steam generator tube heated to a greater extent compared with a second steam generator tube in the once-through heating area has a higher rate of flow of the flow medium compared with the second steam generator tube, at least one of the steam generator tubes having an approximately vertically arranged down-corner section, through which the flow medium can flow in a downward direction, and an approximately vertically arranged riser section which is connected to said down-corner section at a location downstream with respect to a flow direction of the flow-medium, the riser section conveying the flow medium in an upward direction.

20. A steam generator comprising:
   a heating gas duct through which heating gas flows in an approximately horizontal direction;
   a heating gas duct through which heating gas flows in an approximately horizontal direction; and
   a once-through heating area arranged in the heating-gas duct, the once-through heating area comprising a plurality of steam generator tubes connected in parallel with respect to a flow of a flow medium such that a first steam generator tube heated to a greater extent compared with a second steam generator tube in the once-through heating area has a higher rate of flow of the flow medium compared with the second steam generator tube, at least one of the steam generator tubes having an approximately vertically arranged down-comer section, through which the flow medium can flow in a downward direction, and an approximately vertically arranged riser section which is connected to said down-corner section at a location downstream with respect to a flow direction of the flow-medium, the riser section conveying the flow medium in an upward direction,
   wherein the down-corner section of the steam generator tube is connected to the riser section through a connecting section.

* * * * *